(12) United States Patent
Bae et al.

(10) Patent No.: US 12,372,787 B2
(45) Date of Patent: Jul. 29, 2025

(54) FLOATING IMAGE DISPLAY DEVICE AND ELECTRONIC DEVICE INCLUDING THE SAME

(71) Applicant: SAMSUNG ELECTRONICS CO., LTD., Suwon-si (KR)

(72) Inventors: Jungkweon Bae, Suwon-si (KR); Myungho Kim, Suwon-si (KR); Changmin Keum, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 560 days.

(21) Appl. No.: 17/750,000

(22) Filed: May 20, 2022

(65) Prior Publication Data

US 2022/0397762 A1 Dec. 15, 2022

Related U.S. Application Data

(63) Continuation of application No. PCT/KR2022/006496, filed on May 6, 2022.

(30) Foreign Application Priority Data

Jun. 15, 2021 (KR) .................. 10-2021-0077425

(51) Int. Cl.
  *G02B 27/01* (2006.01)
  *G02B 27/00* (2006.01)
  *G03H 1/00* (2006.01)

(52) U.S. Cl.
  CPC ..... *G02B 27/0103* (2013.01); *G02B 27/0093* (2013.01); *G03H 1/0005* (2013.01); *G03H 2001/0088* (2013.01)

(58) Field of Classification Search
  CPC .................................................. G02B 27/0103
  See application file for complete search history.

(56) References Cited

U.S. PATENT DOCUMENTS 8,730,308 B2 * 5/2014 Maekawa ............. G02B 30/56
  348/51
9,313,416 B2 4/2016 Sasaki
(Continued)

FOREIGN PATENT DOCUMENTS

CA 2068984 C 10/1998
EP 1 507 178 A1 2/2005
(Continued)

OTHER PUBLICATIONS

Communication dated Jul. 5, 2024, issued by European Patent Office in European Patent Application No. 22825153.4.
(Continued)

*Primary Examiner* — Edmond C Lau
(74) *Attorney, Agent, or Firm* — Sughrue Mion, PLLC

(57) ABSTRACT

A floating image display device includes: an image forming device configured to form a source image; a waveguide configured to output a light of the source image to another location by guiding the light; a holographic optical device provided on a proceeding path of the light output from the waveguide, the holographic optical device including a hologram pattern that diffracts incident light of a certain incident angle region output from the waveguide by a set target diffraction angle and a floating element including a plurality of corner reflectors and forming a floating image of the source image by forming an image of the light output from the holographic optical device at a certain location in mid-air.

20 Claims, 18 Drawing Sheets

(56) References Cited

U.S. PATENT DOCUMENTS

| | | | |
|---|---|---|---|
| 9,826,149 | B2 | 11/2017 | Chalom et al. |
| 10,133,075 | B2 | 11/2018 | Bailey et al. |
| 10,146,053 | B2 | 12/2018 | Yuan et al. |
| 10,477,197 | B2 | 11/2019 | Bruder et al. |
| 10,650,503 | B2 | 5/2020 | Onuki |
| 11,543,774 | B2 | 1/2023 | Smith et al. |
| 11,609,480 | B2 * | 3/2023 | Oh .................... G02B 3/00 |
| 2013/0265625 | A1 | 10/2013 | Facke et al. |
| 2015/0378515 | A1 | 12/2015 | Powell |
| 2017/0227928 | A1 | 8/2017 | Suginohara |
| 2019/0156715 | A1 * | 5/2019 | James .................. G06F 3/017 |
| 2019/0285904 | A1 | 9/2019 | Kim et al. |
| 2019/0339436 | A1 | 11/2019 | Lee et al. |
| 2020/0225416 | A1 * | 7/2020 | Bablumyan ............ G02B 6/28 |
| 2022/0236587 | A1 | 7/2022 | Yanai et al. |
| 2023/0018634 | A1 * | 1/2023 | Mori .................. G02B 6/0035 |

FOREIGN PATENT DOCUMENTS

| | | |
|---|---|---|
| JP | 2017142279 A | 8/2017 |
| KR | 1020080056932 A | 6/2008 |
| KR | 1020160148739 A | 12/2016 |
| KR | 10-1828180 B1 | 2/2018 |
| KR | 1020190035941 A | 4/2019 |
| KR | 10-2020-0053872 A | 5/2020 |
| WO | 2009/102670 A1 | 8/2009 |
| WO | 2019/245067 A1 | 12/2019 |
| WO | 2020/069536 A1 | 4/2020 |
| WO | 2021075180 A1 | 4/2021 |

OTHER PUBLICATIONS

Jeong-Hyeon Lee et al., "Holographic Solar Energy Concentrator Using Angular Multiplexed and Iterative Recording Method", IEEE Photonics Journal, vol. 8, No. 6, DOI: 10.1109/JPHOT.2016.2634699, Dec. 2016, 12 pages total.

Mei-Lan Piao et al., "Full-color holographic diffuser using time-scheduled iterative exposure", Applied Optics, vol. 54, No. 16, Jun. 2015, 8 pages total.

Lingguo Bu, "Modeling the Mirascope Using Dynamic Technology", Mathematical Association of America, Convergence, DOI:10.4169/loci003595, May 2011, 2 pages total.

Daisuke Miyazaki et al., "Volumetric Display System Using a Digital Micromirror Device Based on Inclined-Plane Scanning", Journal of Display Technology, vol. 6, No. 10, DOI: 10.1109/JDT.2010.2047243, 2010, 6 pages total.

"True 3D Display Aerial Burton", Burton Inc., 2018, 1 page total, http://www.burton-jp.com/en/.

"ASKA3D", Asukanet Co., Ltd., 2022, 4 pages total, www.aska3d.com/en/.

Chao Yu et al., "Highly efficient waveguide display with space-variant volume holographic gratings", Applied Optics, vol. 56, No. 34, Nov. 2017, 8 pages total.

Hiroshi Mukawa et al., "A full-color eyewear display using planar waveguides with reflection volume holograms", Journal of the Society for Information Display, DOI: 10.1889/JSID17.3.185, Mar. 2009, 10 pages total.

"How to evaluate various AR optical display solutions? Here is a technical interpretation and technical progress from 'Long Jing Optoelectronics'", Chao Technology, WeChat public account "Long Jing Photoelectricity" (ID: Lochn2014), May 2020, 26 pages total, https://www.ww01.net/en/archives/69551.

Hoda Akbari et al., "Using acrylamide based photopolymers for fabrication of holographic optical elements in solar energy applications", Technological University Dublin, Applied Optics, 53, doi:10.1364/AO.53.001343, Feb. 2014, 16 pages total.

International Search Report (PCT/ISA/220 and PCT/ISA/210) and Written Opinion issued Aug. 11, 2022 by the International Searching Authority in corresponding International Patent Application No. PCT/KR2022/006496.

* cited by examiner

FLOATING IMAGE DISPLAY DEVICE AND ELECTRONIC DEVICE INCLUDING THE SAME

CROSS-REFERENCE TO RELATED APPLICATION

This application is a bypass continuation of International Application No. PCT/KR2022/006496, filed on May 6, 2022, which is based on and claims priority to Korean Patent Application No. 10-2021-0077425, filed on Jun. 15, 2021, in the Korean Intellectual Property Office, the disclosures of which are incorporated herein by reference in their entirety.

TECHNICAL FIELD

The disclosure relates to a device for displaying a floating image.

BACKGROUND ART

A floating image display device is a device for displaying an image, which when viewed, appears to be in mid-air or aerially spaced away from a display panel.

Recently, in view of the increase in demand for augmented reality (AR) and virtual reality (VR) technologies, and in view of the increased interest in hygiene (i.e., to prevent spread of communicable diseases to others), demand for a floating image display device that is an electronic device capable of a non-contact interaction is increasing.

A dihedral corner reflector array (DCRA) is used to form a floating image. The floating image is formed when a light containing a source image is reflected twice at the DCRA and the light gathers again at an opposite side of the DCRA. Here, a location where the floating image is formed is away from the DCRA by a distance between the DCRA and the source image. In other words, a distance between the DCRA and a location where the floating image is formed is equal to or greater than a distance between the DCRA and the source image. As such, a space corresponding to a height for forming the floating image needs to be secured below the DCRA. Accordingly, the volume occupied by an optical system may increase.

DESCRIPTION OF EMBODIMENTS

Technical Problem

Provided is a floating image display device for simplifying an optical system.

Solution to Problem

According to an aspect of the disclosure, there is provided a floating image display device including: an image forming device configured to form a source image; a waveguide configured to guide a light of the source image input into the waveguide at one location to be output at another location; a holographic optical device provided on a proceeding path of the light output from the waveguide, the holographic optical device including a hologram pattern configured to diffract the light having a first incident angle region by a target diffraction angle; and a floating element including a plurality of corner reflectors, the floating configured to form a floating image of the source image by forming an image of the light output from the holographic optical device at a first location away from the floating element in mid-air.

The holographic optical device may include a plurality of types of angular selective hologram patterns configured to selectively act according to an incident angle of the light.

The plurality of types of angular selective hologram patterns may include different reaction angle regions.

A total region of the reaction angle regions of the plurality of types of angular selective hologram patterns may include the first incident angle region, and wherein a number of the plurality of types is set such that the total region is in a range equal to or greater than the first incident angle region.

A size of each of the reaction angle regions is equal to or greater than 1° and equal to or less than 5°.

The holographic optical device may include a first holographic optical element and a second holographic optical element, which are provided along the proceeding path of the light, and wherein the first holographic optical element and the second holographic optical element act on different angle regions in the first incident angle region.

Each of the first and second holographic optical elements may include a plurality of types of angular selective hologram patterns configured to selectively act according to an incident angle of the light.

The first holographic optical element may include first angular selective hologram patterns, among the plurality of angular selective hologram patterns, configured to diffract an incident light in a first range by the target diffraction angle and distributively manage the first range, and wherein the second holographic optical element may include second angular selective hologram patterns, among the plurality of angular selective hologram patterns, configured to diffract an incident light in a second range different from the first range by the target diffraction angle and distributively manage the second range.

A total region of the first range and the second range may include the first incident angle region. and wherein total region of the first range and the second range is in a range equal to or greater than the first incident angle region.

The floating image display device may include a third holographic optical element configured to act on a third region different from a first region corresponding to of the first holographic optical element and a second region corresponding to the second holographic optical element.

The target diffraction angle is set based on a distance between the floating element and the first location where the floating image is formed.

A thickness of an optical system is smaller than a distance between the floating element and the first location where the floating image is formed, the optical system being formed by the image forming device, the waveguide, and the holographic optical device.

A thickness of an optical system is equal to or less than ¼ of a distance between the floating element and the first location where the floating image is formed.

The hologram pattern is a polarization dependent hologram pattern configured to output a primary light diffracted by the target diffraction angle and a non-diffracted zero-order light in different polarization states.

The floating image display device may include a polarization filter provided between the floating element and the holographic optical device, the polarization filter configured to transmit the primary light, and block the zero-order light.

The waveguide may include: a guiding member configured to totally reflect an incident light a plurality of times therein; an input coupler configured to input the light of the source image at an angle to be totally reflected in the guiding member; and an output coupler configured to externally output the light totally reflected the plurality of times in the guiding member.

The input coupler may include a diffraction pattern, wherein a diffraction angle θd by the diffraction pattern is set to satisfy a following condition: a sin(1/n)<θd<a tan(W/(2 t)), wherein n denotes a refractive index of the guiding member, t denotes a thickness of the guiding member, and W denotes a width of the input coupler.

The output coupler may include a diffraction pattern, wherein the diffraction pattern is configured to output a light in a direction parallel to a direction in which a light is incident on the input coupler.

According to another aspect of the disclosure, there is provided an electronic device including: a floating image display device including: an image forming device configured to form a source image; a waveguide configured to guide a light of the source image input into the waveguide at a first location to be output at a second location; a holographic optical device provided on a proceeding path of the light output from the waveguide, the holographic optical device including a hologram pattern configured to diffract the light having a first incident angle region by a target diffraction angle; and a floating element including a plurality of corner reflectors, the floating configured to form a floating image of the source image by forming an image of the light output from the holographic optical device at a first location away from the floating element in mid-air.

The electronic device may include a sensor configured to recognize a gesture of a user with respect to the floating image; and a processor configured to execute a certain application associated with the gesture.

Advantageous Effects of Disclosure

A floating image display device has a thin optical system structure and may form a floating image at a location at a desired height.

A floating image display device may provide a floating image having a reduced ghost effect.

MODE OF DISCLOSURE

Figure 1:
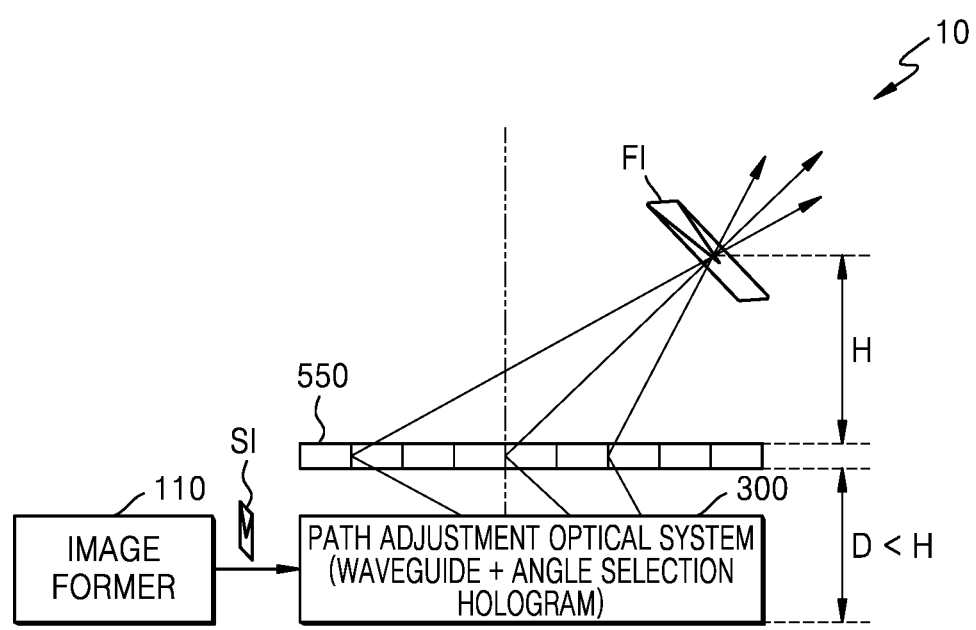
FIG. 1 is a conceptual diagram for schematically describing a floating image display device, according to example embodiments of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings such that one of ordinary skill in the art may easily implement the disclosure. However, the disclosure may be implemented in various different forms and is not limited to the embodiments of the disclosure described herein. Also, in the drawings, parts irrelevant to the description are omitted in order to clearly describe the disclosure, and like reference numerals designate like elements throughout the specification.

Throughout the specification, when a part is "connected" to another part, the part may not only be "directly connected" to the other part, but may also be "electrically connected" to the other part with another element in between. In addition, when a part "includes" a certain element, the part may further include another element instead of excluding the other element, unless otherwise stated.

In addition, terms such as "unit" and the like described in the specification denote a unit that processes at least one function or operation, which may be implemented in hardware or software, or implemented in a combination of hardware and software.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of embodiments of the disclosure. Thus, the terms used herein have to be defined based on the meaning of the terms together with the description throughout the specification.

The term "hologram pattern" used in the present specification denotes a pattern formed on a photosensitive medium according to interference of light waves (object waves and reference waves).

The term "holographic optical element" used in the present specification denotes a photosensitive medium where a hologram pattern is formed (recorded).

The term "object wave" used in the present specification denotes one of waves forming an interference pattern when a hologram pattern is generated, and includes information to be reproduced or changed.

The term "reference wave" used in the present specification is one of waves forming an interference pattern when a hologram pattern is obtained, and is generally used to reconfigure an object wave.

The term "diffraction optical element" used in the present specification denotes an optical device having a microstructure of a uniform period or variable period according to a hologram pattern or a given rule, and converting a transmitted or reflected light according to a result of diffraction by the hologram pattern or microstructure. The "diffraction optical element" may include the meaning of a "holographic optical element".

The term "transmissive diffraction optical element" used in the present specification denotes a diffraction optical element in which a light is converted when passing through the element.

The term "reflective diffraction optical element" used in the present specification denotes a diffraction optical element in which a light is converted when reflected from the element.

Figure 2:
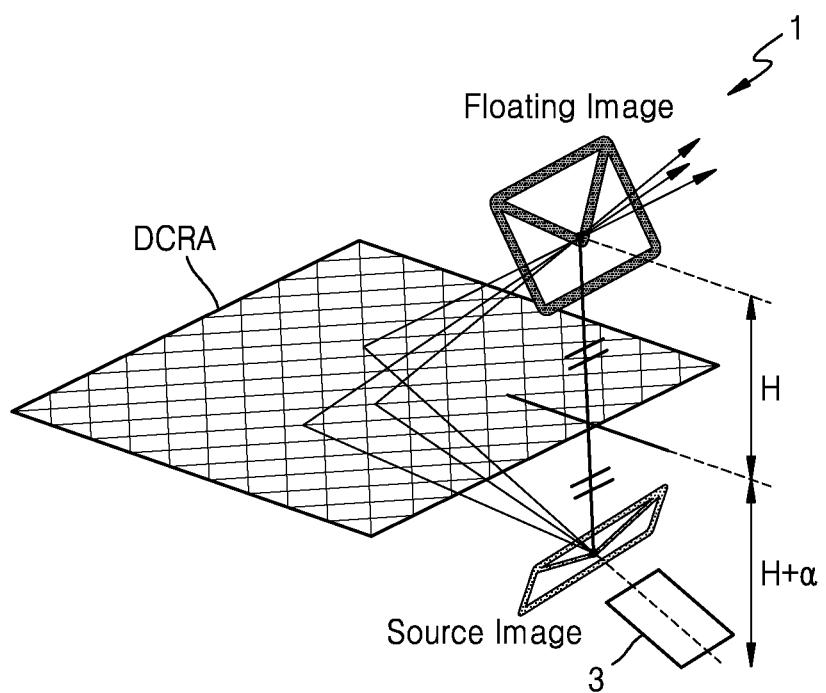
FIG. 2 is a schematic diagram of a floating image display device according to a comparative example.

FIG. 1 is a conceptual diagram for schematically describing a floating image display device 10, according to example embodiments of the disclosure. FIG. 2 is a schematic diagram of a floating image display device 1 according to a comparative example.

Referring to FIG. 1, the floating image display device 10 is a device for forming a real image (a floating image FI) of a source image SI formed by an image forming device 110 in mid-air (aerial) spaced apart from a display surface of the image forming device 110. Hereinafter, a real image of a source image formed in mid-air (aerial) will be referred to as a floating image.

Referring to the floating image display device 1 of the comparative example of FIG. 2, a dihedral corner reflector array (DCRA) is used to form a floating image. A light containing a source image is reflected twice at the DCRA and gathered again at an opposite side of the DCRA, thereby forming the floating image. Here, a location where the floating image is formed is a location away from the DCRA by a distance between the DCRA and the source image. In other words, a height H at which the floating image is formed is equal to a vertical distance from the DCRA to the source image. Also, because the floating image needs to float in mid-air in a diagonal direction oblique to the DCRA, an image forming device 3 needs to be arranged such that the source image is also formed in a diagonal direction symmetrical to the floating image. Accordingly, the thickness of an optical system placed below the DCRA is H+α that is greater than the height H at which the floating image is formed. Due to such a principle, there is a limit to reducing optical system volume of the floating image display device 1.

Referring to FIG. 1, the floating image display device 10 according to an example embodiment of the disclosure includes the image forming device 110 for forming the source image SI and a floating element 550 for forming the floating image FI by forming the source image SI at the height H in mid-air. The floating image display device 10 further includes a path adjustment optical system 300 capable of reducing the thickness D of an optical system below the floating element 550 to be less than the height H.

The path adjustment optical system 300 may change a proceeding direction of an incident light such that the light is incident on the floating element 550 at a certain incident angle. The path adjustment optical system 300 may include a waveguide and a holographic optical element. The certain incident angle is an angle set in consideration of the height H at which the floating image FI is formed, and may be realized by the holographic optical element. According to an example embodiment, the certain incident angle is proportional to the height H at which the floating image FI is formed. The holographic optical element includes an angular selective hologram pattern and may satisfy an incident angle condition regarding the floating element 550 by emitting the incident light by diffracting the incident light by a certain angle. A certain angle for a hologram pattern diffracting an incident light, i.e., a difference between an emitting angle by diffraction by the hologram pattern and an incident angle, will now also be referred to as a target diffraction angle.

The angular selective hologram pattern is a hologram pattern capable of emitting a light incident at a reaction angle within a certain range by converting the light by a target diffraction angle. Such a hologram pattern may be formed by recording, on a photosensitive medium, an interference pattern of an object wave and a reference wave having different proceeding directions by the target diffraction angle.

Figure 3A:
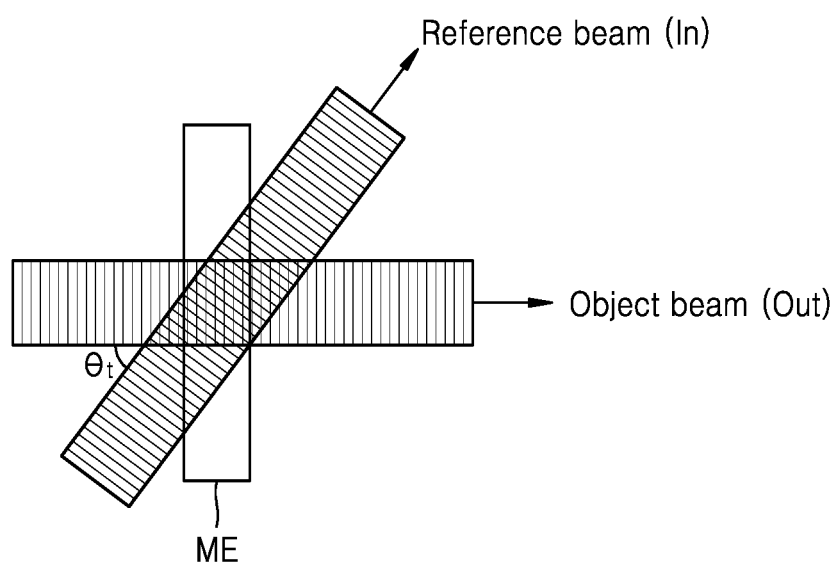
FIGS. 3A and 3B are diagrams for respectively describing a method of forming a hologram pattern provided in a floating image display device, and acting of the hologram pattern, according to example embodiments of the disclosure.
Figure 3B:
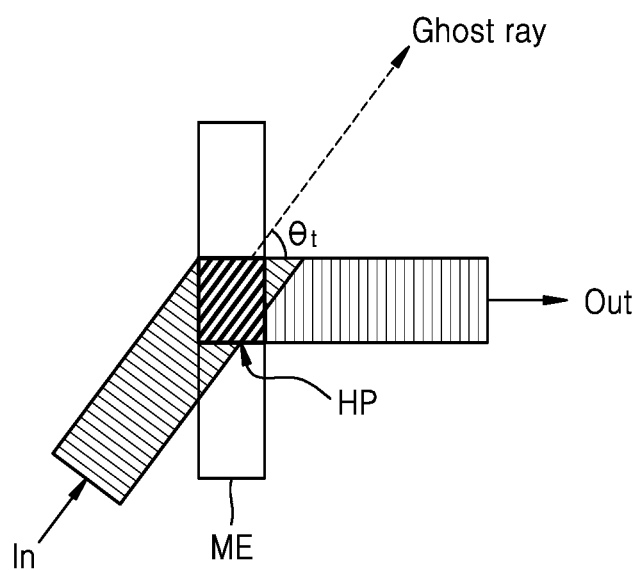

FIGS. 3A and 3B are diagrams for respectively describing a method of forming a hologram pattern provided in a floating image display device, and acting of the hologram pattern, according to example embodiments of the disclosure.

Referring to FIG. 3A, an interference pattern of a reference wave (reference beam) and an object wave (object beam) having a same wavelength band and different proceeding directions by a target diffraction angle $\theta_t$ is recorded on a photosensitive medium ME. The proceeding direction of the reference wave is set in consideration of a direction of a beam to be input to a hologram pattern after the hologram pattern is formed. The proceeding direction of the object wave is a direction different from the proceeding direction of the reference wave by the target diffraction angle $\theta_t$, and is a direction in which a beam incident on the hologram pattern in a direction of the reference wave is output.

Referring to FIG. 3B, when a beam in a same direction as a proceeding direction of a reference wave used while recording a hologram pattern HP formed according to a process of FIG. 3A is input, a light is output in a direction of an object wave used while recording the hologram pattern HP. In other words, a beam input to the hologram pattern HP may be output after an angle of the beam is changed by the target diffraction angle $\theta_t$. Efficiency (diffraction efficiency) of such an angle change is not 100% and a partial light may be emitted in a direction input to the hologram pattern HP. This partial light is referred to as a ghost ray and an example embodiment of the disclosure for reducing an effect of the ghost ray will be described with reference to FIG. 11.

Meanwhile, in the floating image display device 10 of FIG. 1, the light of the source image SI formed by the image forming device 110 is incident on the holographic optical element at different angles according to locations while being transmitted to the floating element 550, and thus it may not be sufficient to realize a desired diffraction angle only by using one type of angular selective hologram pattern.

Figure 4:
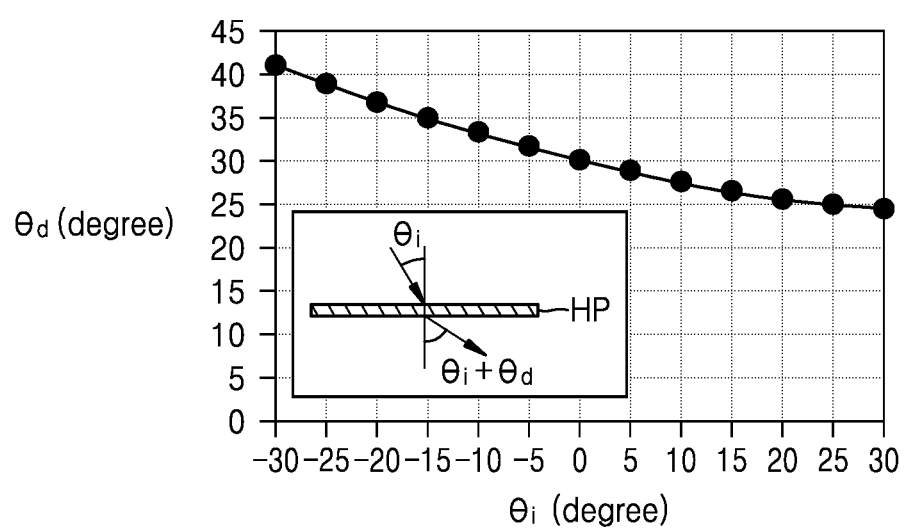
FIG. 4 is an exemplary graph of a diffraction angle shown in one type of hologram pattern, according to an incident angle.

FIG. 4 is an exemplary graph of a diffraction angle shown in one type of hologram pattern, according to an incident angle. The hologram pattern is formed to indicate a target diffraction angle of 30° based on a reference wave incident at 0°, and the graph shows a relationship of $\theta_i$ and $\theta_d$, where $\theta_i$ denotes the incident angle and $\theta_i+\theta_d$ denotes an emitting angle diffracted by the hologram pattern. Referring to the graph, when the incident angle $\theta_i$ of a beam incident on the hologram pattern moves away from 0°, $\theta_d$ moves away from 30°, i.e., the target diffraction angle. Such an error may appear as image distortion.

The floating image display device 10 according to an example embodiment of the disclosure reduces the error that may cause the image distortion by using a multiplexed holographic optical element in which a plurality of types of angular selective hologram patterns acting for each region of the incident angle are overlapped and recorded. When setting the plurality of types of angular selective hologram patterns employed in the multiplexed holographic optical element, an angle range may be considered by referring to the graph of FIG. 4 to an extent that the error may be ignored. For example, when a required range of incident angle is −10° to 10°, five types of angular selective hologram patterns having the width of a reaction angle of 4° may be used or ten types of angular selective hologram patterns having the width of a reaction angle of 2° may be used.

Hereinafter, a floating image display device according to various example embodiments of the disclosure will be described.

Figure 5:
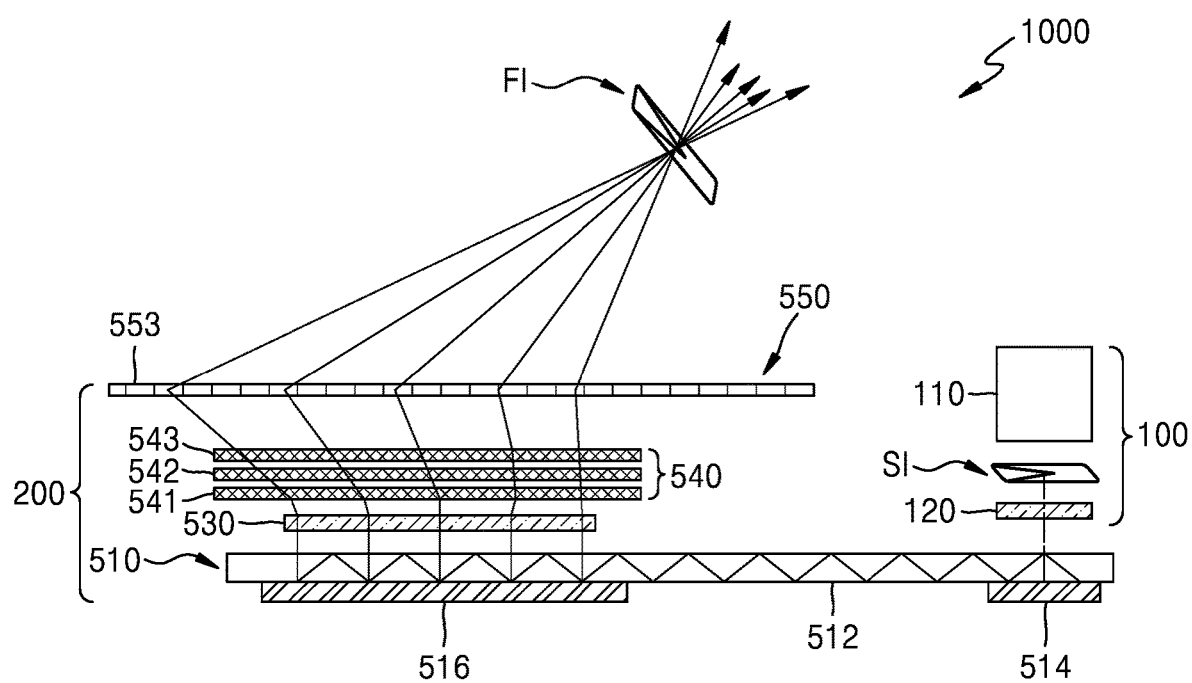
FIG. 5 is a cross-sectional view of a schematic structure of a floating image display device, according to an example embodiment of the disclosure.
Figure 6:
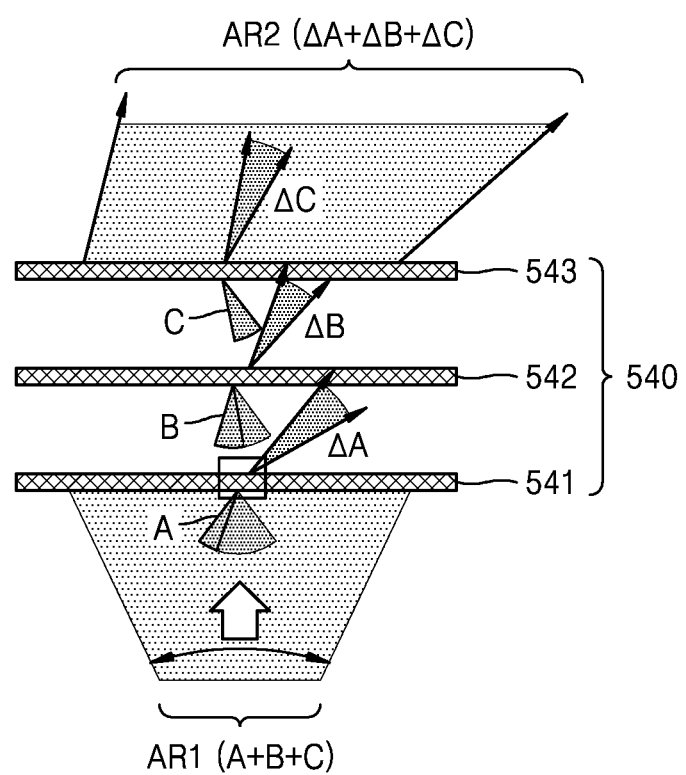
FIG. 6 is a conceptual diagram for describing acting of a holographic optical device provided in a floating image display device, according to an example embodiment of the disclosure.
Figure 7:
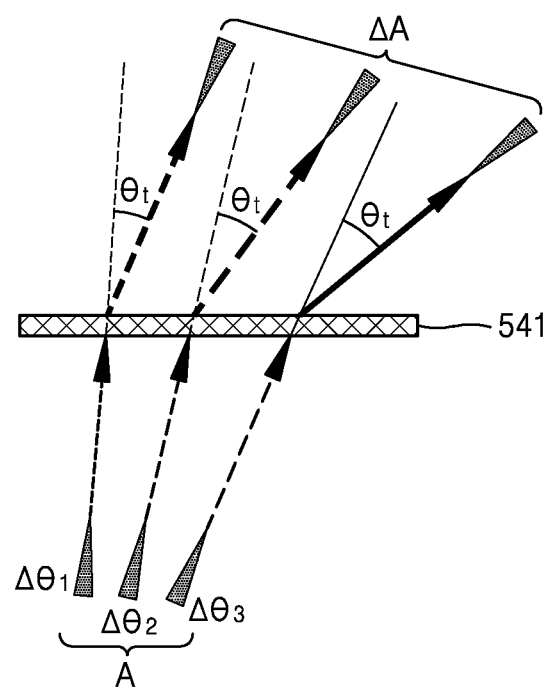
FIG. 7 is a conceptual diagram for describing acting of a multi-recorded angular selective hologram pattern by enlarging a partial region of FIG. 6.

FIG. 5 is a cross-sectional view of a schematic structure of a floating image display device 1000, according to an example embodiment of the disclosure. FIG. 6 is a conceptual diagram for describing acting of a holographic optical device 540 provided in the floating image display device 1000, according to an example embodiment of the disclosure, and FIG. 7 is a conceptual diagram for describing acting of a multi-recorded angular selective hologram pattern by enlarging a partial region of FIG. 6.

The floating image display device 1000 includes an imaging module 100 and a floating module 200.

The imaging module 100 forms the source image SI to be floated in mid-air (aerial) and transmits a light of the source image SI to the floating module 200. The imaging module 100 includes the image forming device 110, and may further include a collimating optics 120.

The floating module 200 forms a real image of the source image SI at a certain location in mid-air by using an array of a plurality of corner reflectors. Hereinafter, the real image of the source image SI, formed by the floating module 200, will be referred to as the floating image FI. According to an example embodiment of the disclosure, the holographic optical device 540 including an angular selective hologram is used to reduce the thickness of the floating module 200. The floating module 200 includes a waveguide 510 for guiding the light of the source image SI to output the same at a different location. The floating module 200 further includes the holographic optical device 540 including the angular selective hologram, the floating element 550 where the plurality of corner reflectors are arranged, and may further include a magnifying optics 530.

Detailed components and optical actions of the floating image display device 1000 will be described in detail with reference to FIGS. 5, 6 and 7.

The image forming device 110 forms an image by modulating a light according to image information to be displayed to an observer. A type of source image formed by the image forming device is not specifically limited, and for example, the source image may be a 2-dimensional (2D) image or a 3-dimensional (3D) image. The 3D image may include, for example, a stereo image, a hologram image, a light field image, or an integral photography (IP) image, and may also include a multi-view or super multi-view type image.

The image forming device 110 may include, for example, a liquid crystal on silicon (LCoS) device, a liquid crystal display (LCD) device, an organic light-emitting diode (OLED) display device, and a digital micromirror device (DMD), and may also include next-generation display devices, such as a micro LED device and a quantum dot (QD) LED device. When a display device provided in the image forming device 110 is a non-emission type device, such as an LCD, the image forming device 110 may further include a light source providing a light for image formation.

The source image SI in FIG. 5 is conceptually illustrated to describe propagation of a light containing the source image SI, and is an image displayed on a display surface of the image forming device 110.

The collimating optics 120 may collect the light of the source image SI to be input to the waveguide 510. The collimating optics 120 may include at least one lens, and for example, may include a collimating lens for collimating the light to be incident on an input coupler 514 provided in the waveguide 510, at a certain angle.

The imaging module 100 may further include, in addition to components shown in FIG. 5, a beam splitter for adjusting an optical path, a relay lens for enlarging or reducing an image, a space filter for removing noise, and the like.

The waveguide 510 is for guiding the light of the source image SI to be output at another location. The waveguide 510 includes a guiding member 512 for transmitting an incident light while totally reflecting the same therein a plurality of times, the input coupler 514 for inputting a light at an angle to be totally reflected in the guiding member 512, and an output coupler 516 for externally outputting the light that has been totally reflected in the guiding member 512 the plurality of times.

The guiding member 512 is formed of an optically transparent material, and may be formed of a transparent plastic material or glass having a refractive index greater than 1. Here, a transparent material denotes a material through which a light in a visible light band may penetrate, and transparency thereof may not be 100% and the transparent material may have a certain color.

The input coupler 514 may include a diffractive optical element for diffracting a light. The diffractive optical element may include a diffraction pattern formed of a microstructure with a certain lattice period or a hologram pattern. Such a diffraction pattern may be set such that a diffraction angle $\theta_d$ satisfies a following condition: $a\sin(1/n) < \theta_d < a\tan(W/(2t))$ Here, n denotes a refractive index of the guiding member 512, t denotes the thickness of the guiding member 512, and W denotes the width of the input coupler 514.

$a\sin(1/n)$ denotes a minimum value that is a total reflection critical angle, and $a\tan(w/(2t))$ denotes a maximum value for uniformity.

Like the input coupler 514, the output coupler 516 may also include a diffractive optical element for diffracting a light. The diffractive optical element may include a diffraction pattern formed of a microstructure with a certain lattice period or a hologram pattern. The diffraction pattern of the output coupler 516 is for outputting the light outside the guiding member 512 by disabling the light proceeding into the guiding member 512 so that a total reflection condition is not satisfied. To reduce aberration occurrence, the diffraction pattern of the output coupler 516 may be set to output the light in a direction parallel to a direction in which the light is incident on the input coupler 514. The output coupler 516 may include a plurality of types of hologram patterns that overlap to indicate a certain output angle with respect to various incident angles.

The input coupler 514 and the output coupler 516 are both illustrated as reflective diffraction optical elements. However, this is only an example and one or both of the input coupler 514 and the output coupler 516 may be changed to transmissive diffraction optical elements. When the input coupler 514 and/or the output coupler 516 are changed to transmissive diffraction optical elements, a location of each of the input coupler 514 and/or the output coupler 516 may be changed to an opposite side of the guiding member 512 from an illustrated location.

The magnifying optics 530 may be provided between the waveguide 510 and the holographic optical device 540. The magnifying optics 530 is provided such that the light output from the waveguide 510 forms the floating image FI having a certain size after passing through the holographic optical device 540 and the floating element 550, and may include at least one lens.

The holographic optical device 540 is provided on a proceeding path of the light output from the waveguide 510 to diffract, by a set target diffraction angle, a light of a certain incident angle region incident after passing through the waveguide 510 and the magnifying optics 530, and output the same. The holographic optical device 540 includes a first holographic optical element 541, a second holographic optical element 542, and a third holographic optical element 543, which are arranged along the proceeding direction of the light, wherein each of the first holographic optical element 541, the second holographic optical elements 542 and the third holographic optical element 543 include hologram patterns for diffracting, by a target diffraction angle, a light of a certain angle region included in the certain incident angle region. The target diffraction angle is set such that the light output from the waveguide 510 is incident on the floating element 550 at an angle suitable to a height at which the floating image FI is to be formed.

FIG. 6 conceptually illustrates the light in the certain incident angle region being diffracted by the target diffraction angle and output by the first holographic optical element 541, the second holographic optical elements 542 and the third holographic optical element 543 provided in the floating image display device 1000 of FIG. 5.

Referring to FIG. 6, a light of an incident angle region AR1 incident on the holographic optical device 540 is output as a light of an angle region AR2 after passing through the holographic optical device 540. The light of the incident angle region AR1 incident on the holographic optical device 540 is output from the waveguide 510. Hologram patterns provided in the holographic optical device 540 diffract an incident angle by the target diffraction angle $\theta_t$, and when the incident angle region AR1 is indicated to be in a range of θ1 to θ2, the angle region AR2 of the light output from the holographic optical device 540 is in a range of θ1+$\theta_t$ to θ2+$\theta_t$.

As such, while diffracting the light of the incident angle region AR1, the first holographic optical element 541, the second holographic optical elements 542 and the third holographic optical element 543 may distributively manage the incident angle region AR1 by dividing the incident angle region AR1 into three ranges of A, B, and C.

The first holographic optical element 541 may diffract the incident light in a first range A from among the incident angle region AR1 by the target diffraction angle $\theta_t$ and output the incident light in an angle region of ΔA. A light of an incident angle region B+C outside the first range A from among the incident angle region AR1 may be output without being diffracted by the first holographic optical element 541. Here, a light being output without being diffracted indicates that a light is not diffracted by a hologram pattern by an intended target diffraction angle $\theta_t$, but does not indicate that an output direction is completely the same as an incident direction, and refraction or a diffraction of another order may affect the output direction. The same is applied to descriptions below.

The second holographic optical element 542 may diffract an incident light having an incident angle in a second range B by the target diffraction angle $\theta_t$ and output the incident light in an angle region of ΔB. From among lights incident on the second holographic optical element 542, a light in a third range C of an incident angle, which is output without being diffracted by the first holographic optical element 541, and a light in the angle range ΔA, which is output by being diffracted by the first holographic optical element 541, may penetrate through the second holographic optical element 542 without being diffracted.

The third holographic optical element 543 may diffract the incident light having the incident angle in the third range C by the target diffraction angle $\theta_t$ and output the incident light in an angle region of ΔC. A light in an angle range of ΔA, which has been diffracted by the first holographic optical element 541, and a light in an angle range of ΔB, which has been diffracted by the second holographic optical element 542, may penetrate through the third holographic optical element 543 without being diffracted.

The angle region AR2, i.e., ΔA+ΔB+ΔC, output as such is in the range of θ1+$\theta_t$ to θ2+$\theta_t$ obtained by diffracting the incident angle region AR1, i.e., θ1 to θ2, by the target diffraction angle $\theta_t$, and a light of such an angle region may form an image at a location at a desired height after passing through the floating element 550, thereby forming the floating image FI.

Meanwhile, each of the first holographic optical element 541, the second holographic optical elements 542 and the third holographic optical element 543 includes hologram patterns in charge of incident angle ranges described above. As described with reference to FIG. 3A, the hologram pattern is formed by recording, on a photosensitive medium, an interference pattern of a reference wave and an object wave. When a beam of a same property as the reference wave used while recording the hologram pattern formed as such is incident, a beam of a same property as the object wave used while forming the hologram pattern is output. The first holographic optical element 541, the second holographic optical elements 542 and the third holographic optical element 543 include hologram patterns including interference patterns of reference waves and object waves proceeding in different directions and having a same wavelength band. An angle corresponding to a difference between the proceeding directions of the reference wave and object wave is the target diffraction angle $\theta_t$. In other words, a beam corresponding to the object wave is output when a beam corresponding to the reference wave is incident on the hologram pattern that is the interference pattern of the reference wave and object wave having different proceeding directions by the target diffraction angle $\theta_t$. In other words, the beam incident on such a hologram pattern is diffracted by the target diffraction angle $\theta_t$ and output.

Here, only a beam incident at a same angle as the proceeding direction of the reference wave or a similar angle within a certain reaction angle while recording the hologram pattern may be diffracted by the set target diffraction angle $\theta_t$ and output. It may be difficult for only one type of hologram pattern to diffract the light in the first range A covered by the first holographic optical element 541, by the desired target diffraction angle $\theta_t$. An error in which diffraction by the intended target diffraction angle $\theta_t$ does not occur may cause image distortion. To prevent the image distortion, the first holographic optical element 541 may include a plurality of types of angular selective hologram patterns acting selectively according to an incident angle of a light.

FIG. 7 illustrates an example of acting of the first holographic optical element 541 in which three types of angular selective hologram patterns are recorded in an overlapping manner. A plurality of types of angular selective hologram patterns provided in the first holographic optical element 541 may be set to have different reaction angle regions. A first angular selective hologram pattern may diffract a light in an incident angle range of $\Delta\theta_1$ by $\theta t$ and output the same, a second angular selective hologram pattern may diffract a light in an incident angle range of $\Delta\theta_2$ by $\theta t$ and output the same, and a third angular selective hologram pattern may diffract a light in an incident angle range of $\Delta\theta_3$ by $\theta t$ and output the same. According to an example embodiment, each of the first angular selective hologram pattern, the second angular selective hologram pattern and the third angular selective hologram pattern is an interference pattern of an object wave having a proceeding direction different from a reference wave proceeding in a center direction in each reaction angle range by $\theta_t$. The first angular selective hologram pattern, the second angular selective hologram pattern and the third angular selective hologram pattern are spatially recorded in an overlapping manner in the first holographic optical element 541, but are optically distinguished from each other. Moreover, one of the first angular selective hologram pattern, the second angular selective hologram pattern and the third angular selective hologram pattern diffracts a beam incident in a direction within a corresponding reaction angle by $\theta_t$ and outputs the same. A total region of the reaction angle regions $\Delta\theta_1$, $\Delta\theta_2$, and $\Delta\theta_3$ corresponds to the first range A covered by the first holographic optical element 541. The total region of the reaction angle regions $\Delta\theta_1$, $\Delta\theta_2$, and $\Delta\theta_3$ may include the first range A covered by the first holographic optical element 541, and may be set to be wider than the first range A. A size of each of the reaction angle regions $\Delta\theta_1$, $\Delta\theta_2$, and $\Delta\theta_3$ may be equal to or greater than 1° and equal to or less than 5°. For example, $\Delta\theta_1$ may be $-10°$ to $-8°$, $\Delta\theta_2$ may be $-8°$ to $-6°$, and $\Delta\theta_3$ may be $-6°$ to $-4°$. The number of angle ranges or numerical values of angle ranges are only examples, and in the total region of the reaction angle regions $\Delta\theta_1$, $\Delta\theta_2$, and $\Delta\theta_3$, for example, in the above example, more types of angular selective hologram patterns may be further added such that $-10°$ to $-4°$ is the same as the first range A of the light incident on the first holographic optical element 541. For example, a fourth angular selective hologram pattern, a fifth angular selective hologram pattern, and the like, which have a reaction angle region of $-4°$ to $-2°$, a reaction angle region of $-2°$ to $0°$, and the like, may be further recorded on the first holographic optical element 541 such that the sum of the reaction angle regions is equal to or greater than the first range A.

Similarly, the second holographic optical element 542 and the third holographic optical element 543 may each be a multiplexed holographic optical element including a plurality of types of angular selective hologram patterns.

The second holographic optical element 542 may include an angular selective hologram pattern for diffracting a light in an incident angle range of $\Delta\theta_4$ by $\theta t$ and outputting the same, an angular selective hologram pattern for diffracting a light in an incident angle range of $\Delta\theta_5$ by $\theta t$ and outputting the same, and an angular selective hologram pattern for diffracting a light in an incident angle range of $\Delta\theta_6$ by $\theta_t$ and outputting the same. A total region of reaction angle regions $\Delta\theta_4$, $\Delta\theta_5$, and $\Delta\theta_6$ may be the same as the second range B covered by the second holographic optical element 542, or may include the second range B and wider than the second range B.

The third holographic optical element 543 may include an angular selective hologram pattern for diffracting a light in an incident angle range of $\Delta\theta_7$ by $\theta_t$ and outputting the same, an angular selective hologram pattern for diffracting a light in an incident angle range of $\Delta\theta_8$ by $\theta_t$ and outputting the same, and an angular selective hologram pattern for diffracting a light in an incident angle range of $\Delta\theta_9$ by $\theta_t$ and outputting the same. A total region of reaction angle regions $\Delta\theta_7$, $\Delta\theta_8$, and $\Delta\theta_9$ may be the same as the third range C covered by the third holographic optical element 543, or may include the third range C and wider than the third range C.

In the example embodiments described above, three holographic optical elements (e.g., the first holographic optical element 541, the second holographic optical elements 542 and the third holographic optical element 543) and three angular selective hologram patterns (e.g., the first angular selective hologram pattern, the second angular selective hologram pattern and the third angular selective hologram pattern) are provided. However, these numbers are exemplary. As such, according to another example embodiment, more than three holographic optical elements may be provided to be in charge of an angle range divided into more than three ranges, according to the incident angle region AR1. Also, more than three angular selective hologram patterns may be recorded on each hologram optical element in an overlapping manner, in consideration of a covered angle range and reaction angle region. According to another example embodiment, two holographic optical elements may be provided to be in charge of an angle range divided into two ranges, according to the incident angle region AR1. Also, two angular selective hologram patterns may be recorded on each hologram optical element in an overlapping manner, in consideration of a covered angle range and reaction angle region.

The incident angle region AR1 in which a light is incident on the holographic optical device 540 is described to be the same as the total region of the first through third ranges A through C covered by the first holographic optical element 541, the second holographic optical elements 542 and the third holographic optical element 543, but this is only for convenience of description and is not limited thereto. The total region of the first through third ranges A through C of the first holographic optical element 541, the second holographic optical elements 542 and the third holographic optical element 543 may be set to be equal to or greater than the incident angle region AR1.

According to an example embodiment of the disclosure, it is illustrated as if certain distances are formed between the first holographic optical element 541, the second holographic optical elements 542 and the third holographic optical element 543, but this is only for convenience of description, and the first holographic optical element 541, the second holographic optical elements 542 and the third holographic optical element 543 may be arranged such that there are barely no physical distance therebetween.

The floating element 550 includes a plurality of corner reflectors 553, and forms an image of a light output from the holographic optical device 540 at a certain location in mid-air to form the floating image FI that is a real image of the source image SI formed by the image forming device 110. The plurality of corner reflectors 553 each include a plurality of reflection surfaces. The plurality of corner reflectors 553 may be arranged in a 2D array. A surface defined by two directions forming the 2D array is a reference surface of a height at which the floating image FI is formed. In the above description, an angle range of the light output from the holographic optical device 540 is described to be an angle formed with a normal of the reference surface, and is not an angle regarding a reflection surface provided in the corner reflector 553.

Figure 8A:
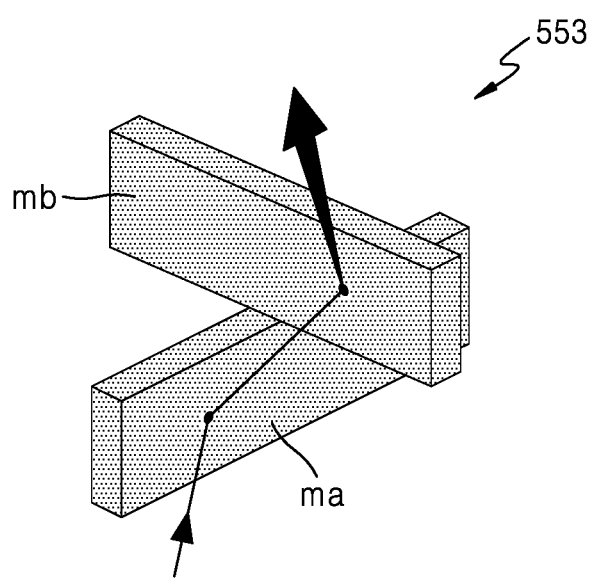
FIGS. 8A and 8B illustrate exemplary structures of a corner reflector provided in a floating element of the floating image display device, according to example embodiments of the disclosure.
Figure 8B:
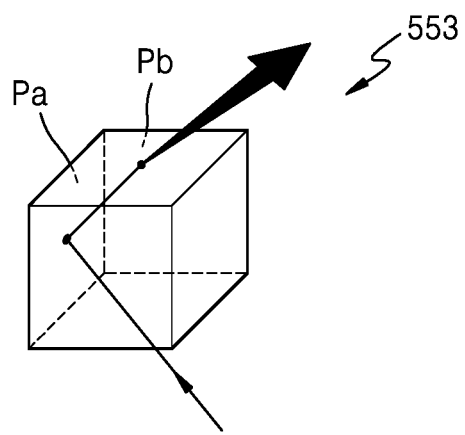

FIGS. 8A and 8B illustrate exemplary structures of the corner reflector 553.

As shown in FIG. 8A, the corner reflector 553 may include two reflectors that are orthogonally arranged. A light incident on the floating element 550 is sequentially reflected at mirror surfaces ma and mb respectively provided at the two reflectors forming the corner reflector 553. Because the light is incident at different angles and reflected according to locations of the plurality of corner reflectors 553, the reflected lights gather at a certain image formation point.

As shown in FIG. 8B, the corner reflector 553 may have a prism shape having a plurality of total reflection surfaces. A light incident on the floating element 550 is sequentially reflected at two adjacent total reflection surfaces pa and pb included in the prism shape forming the corner reflector 553. Because the light is incident at different angles and reflected according to locations of the plurality of corner reflectors 553, the reflected lights gather at a certain image formation point.

A well-known DCRA having any one of various shapes may be employed as the floating element 550.

As such, in the floating image display device 1000, when the formed source image SI is transmitted from the imaging module 100 to the floating module 200, the source image SI passes through the waveguide 510 and the holographic optical device 540, and is incident on the floating element 550 at an angle matching a desired height at which the floating image FI is to be formed. In such a structure, the source image SI and the floating image FI are not at symmetric locations with respect to the floating element 550, and an optical system structure provided below the floating element 550 may have the thickness less than the height at which the floating image FI is formed, for example, the thickness equal to or less than ½, equal to or less than ¼, or equal to or less than ⅕.

Figure 9:
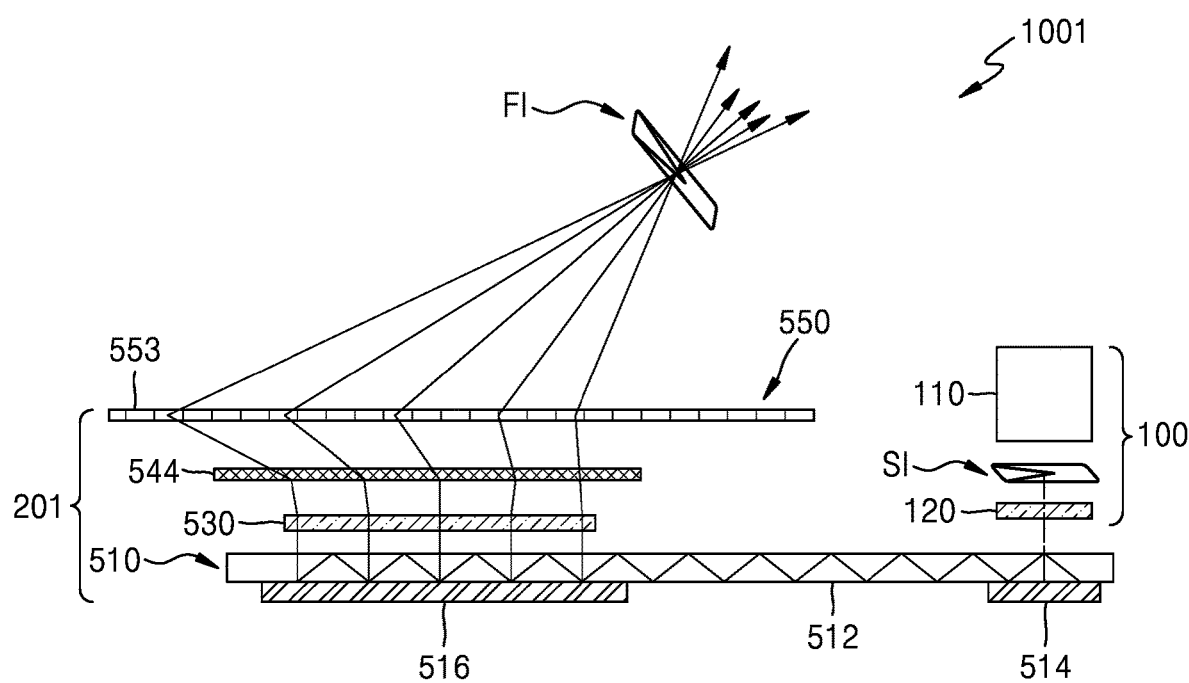
FIG. 9 is a cross-sectional view of a schematic structure of a floating image display device, according to another example embodiment of the disclosure.

FIG. 9 is a cross-sectional view of a schematic structure of a floating image display device 1001, according to another example embodiment of the disclosure.

The floating image display device 1001 includes the imaging module 100 for forming the source image SI and a floating module 201 for forming the floating image FI by forming the source image SI in mid-air.

The floating image display device 1001 according to the example embodiment of the disclosure is different from the floating image display device 1000 described above in that the floating module 201 includes one holographic optical element 544, and descriptions about common elements are omitted.

The holographic optical element 544 includes a plurality of types of angular selective holograms that are overlapped. The number of the plurality of types of angular selective holograms may be set considering a target diffraction angle and an angle range of a light incident on the holographic optical element 544, and the number of types may be, for example, equal to or greater than 3 and equal to or less than 10, but is not limited thereto. The number of the plurality of types of angular selective holograms may be set based on the target diffraction angle and the angle range of a light incident on the holographic optical element 544.

When one holographic optical element 544 is used, it may be easier to reduce the thickness of an optical system of the floating module 201 compared to when a plurality of holographic optical elements arranged in a plurality of layers are used like the floating image display device 1000 described above. In the example embodiment of the disclosure, the number of types of angular selective hologram patterns provided in the holographic optical element 544 may be limited, and thus the floating image display device 1001 may be used when an incident angle range is relatively narrow.

Figure 10:
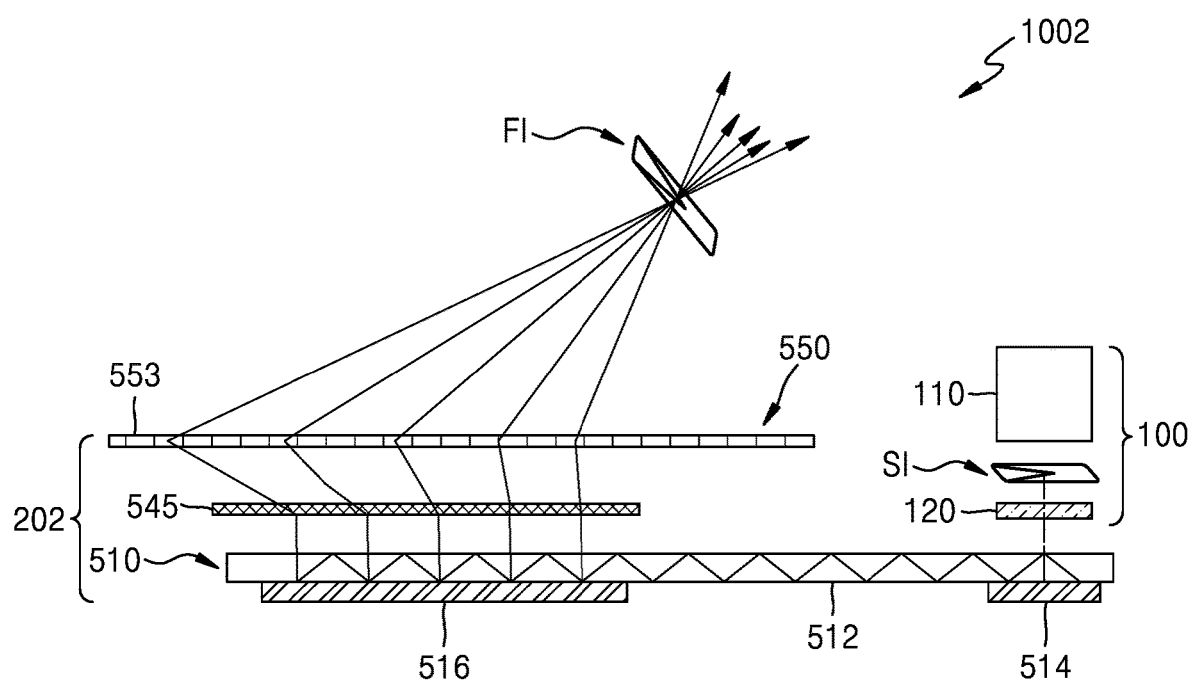
FIG. 10 is a cross-sectional view of a schematic structure of a floating image display device, according to another example embodiment of the disclosure.

FIG. 10 is a cross-sectional view of a schematic structure of a floating image display device 1002, according to another example embodiment of the disclosure.

The floating image display device 1002 includes the imaging module 100 for forming the source image SI and a floating module 202 for forming the floating image FI by forming the source image SI in mid-air.

The floating image display device 1002 according to the example embodiment of the disclosure is different from the floating image display devices 1000 and 1001 in that the floating module 202 includes one holographic optical element 545 where one type of angular selective hologram is recorded and does not include the magnifying optics 530, and descriptions about common elements are omitted.

As described with reference to the graph of FIG. 4, a target diffraction angle set in an angular selective hologram pattern is related to a determined reference angle, and an error may occur regarding an incident light incident at an incident angle different from the reference angle. Image distortion may be caused by such an error. However, when an incident angle range incident on the holographic optical element 545 is relatively narrow because the magnifying optics 530 is not provided, the example embodiment of the disclosure forms the floating image FI having minor image distortion and may be realized in a simplest form.

Figure 11:
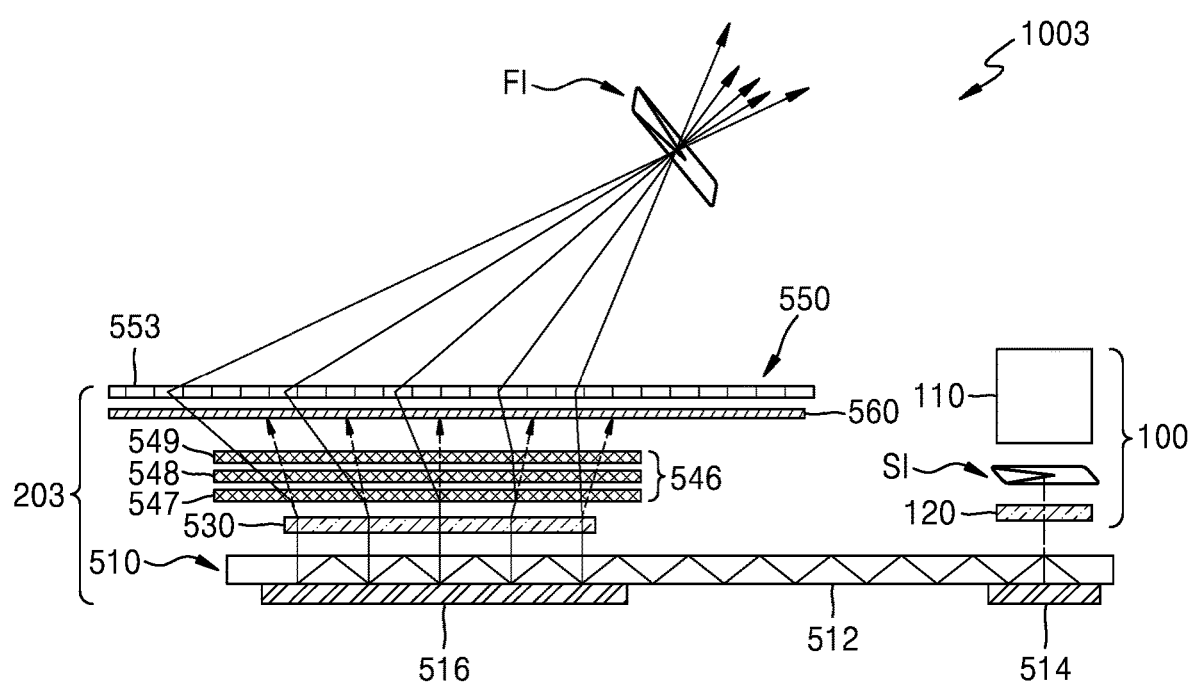
FIG. 11 is a cross-sectional view of a schematic structure of a floating image display device, according to another example embodiment of the disclosure.
Figure 12A:
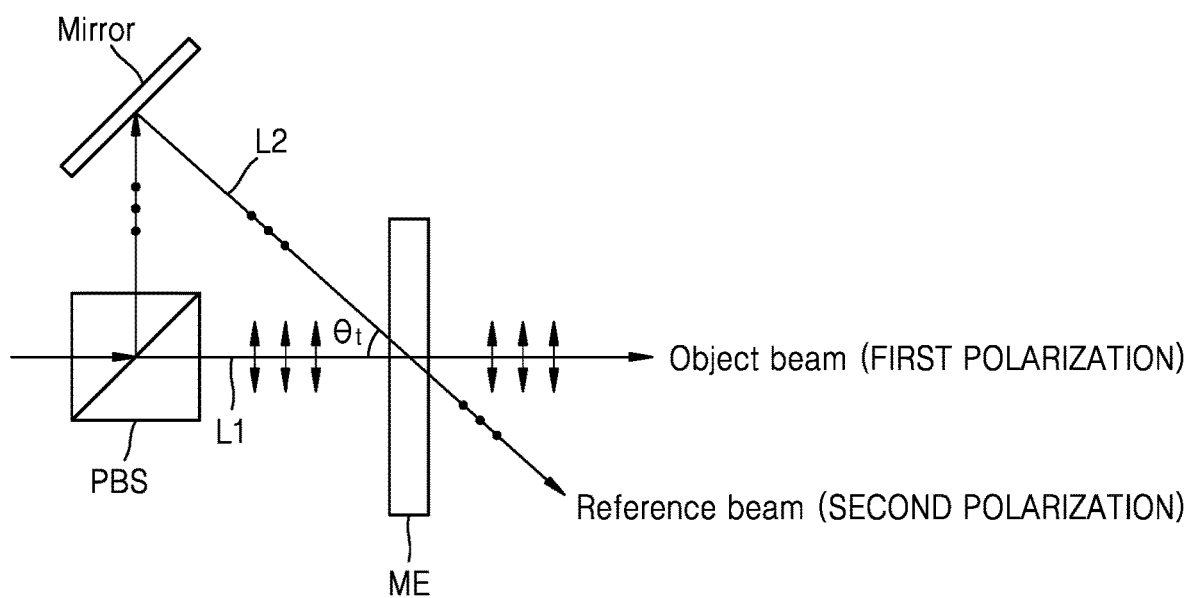
FIGS. 12A and 12B are diagrams for respectively describing a method of forming a polarization dependent hologram pattern provided in the floating image display device of FIG. 11, and acting of the polarization dependent hologram pattern.
Figure 12B:
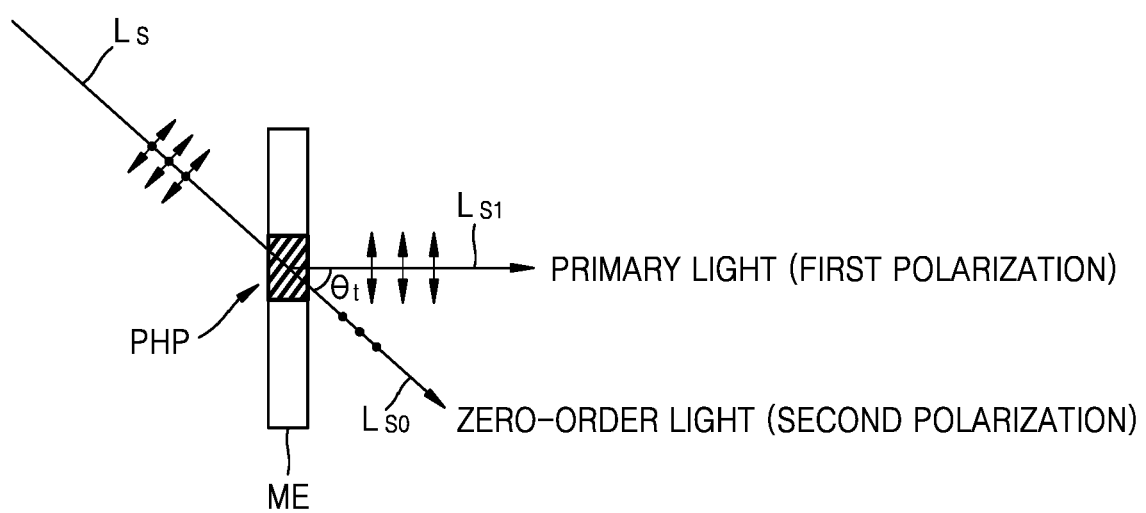

FIG. 11 is a cross-sectional view of a schematic structure of a floating image display device 1003, according to another example embodiment of the disclosure, and FIGS. 12A and 12B are diagrams for respectively describing a method of forming a polarization dependent hologram pattern provided in the floating image display device 1003 of FIG. 11, and acting of the polarization dependent hologram pattern.

Referring to FIG. 11, the floating image display device 1003 includes the imaging module 100 for forming the source image SI and a floating module 203 for forming the floating image FI by forming the source image SI in mid-air.

The floating image display device 1003 according to the example embodiment of the disclosure is different from the floating image display device 1000 of FIG. 5 in that the floating module 203 includes polarization dependent angular selective hologram patterns and further includes a polarization filter 560, and descriptions about common elements are omitted.

The floating image display device 1003 of the example embodiment of the disclosure is proposed to reduce a ghost ray that may be formed near the floating image FI.

In the description of FIGS. 3A and 3B, it has been described that when a beam is incident on the hologram pattern HP in a same direction as a reference wave, the beam is diffracted by a target diffraction angle and output, and at this time, a partial light (ghost ray) is output at an incident angle without being diffracted. As such, a beam emitted after being diffracted in a set direction is referred to as a primary light, and a beam emitted without being diffracted is referred to as a zero-order light. The floating image display device 1003 of the example embodiment of the disclosure uses a polarization dependent hologram pattern, and thus a zero-order light and a primary light are output in different polarization states. Also, the ghost ray (zero-order light) does not reach the floating element 550 by using the polarization filter 560.

A holographic optical device 546 includes a first holographic optical element 547, a second holographic optical element 548, and a third holographic optical element 549. According to an example embodiment, each of the first holographic optical element 547, the second holographic optical element 548, and the third holographic optical element 549 may include polarization dependent hologram patterns that output the primary light diffracted by a target diffraction angle and a zero-order light that is not diffracted, in different polarization states. However, the disclosure is not limited to thereto, and as such, according to another example embodiment, one or more of the first holographic optical element 547, a second holographic optical element 548, and a third holographic optical element 549 may include polarization dependent hologram patterns that output the primary light diffracted by a target diffraction angle and a zero-order light that is not diffracted, in different polarization states.

To form the polarization dependent hologram pattern, referring to FIG. 12A, a reference wave and an object wave proceed in directions different by the target diffraction angle $\theta_t$, and have different polarization states. As such, to form two beams L1 and L2 having different polarization states and proceeding in different directions, a polarization beam splitter PBS and a mirror may be used. The polarization beam splitter PBS splits an incident beam in different directions according to polarization. For example, as shown in FIG. 12A, the polarization beam splitter PBS splits the incident beam according to polarization components such that the beam L1 of first polarization is transmitted towards a photosensitive medium ME by transmitting the beam L1 straight without a change in a direction, and the beam L2 of second polarization is transmitted towards the photosensitive medium ME after being reflected by the mirror by refracting the beam L2 in another direction. The first polarization and the second polarization may be linear polarizations in perpendicular directions, and for example, one may be S polarization and the other may be P polarization. An interference pattern of the beam L1 of the first polarization and the beam L2 of the second polarization may be recorded on the photosensitive medium ME. The beam L1 of the first polarization is an object wave in a first polarization state and the beam L2 of the second polarization is a reference wave in a second polarization state. An angle between the object wave and the reference wave, i.e., the target diffraction angle $\theta_t$, may be adjusted by adjusting an arrangement angle of the mirror.

Referring to FIG. 12B, a light $L_s$ of non-polarization is incident on a polarization dependent hologram pattern PHP formed via a process of FIG. 12A. The light $L_s$ of non-polarization may be a light in which a light of first polarization and a light of second polarization are randomly mixed, and the polarization dependent hologram pattern PHP acts differently on the light of the first polarization and the light of the second polarization. The polarization dependent hologram pattern PHP diffracts the light of the first polarization by the target diffraction angle $\theta_t$, and transmits the light of the second polarization. In other words, a primary light $L_{s1}$ diffracted by the target diffraction angle $\theta_t$ by the polarization dependent hologram pattern PHP is output in a first polarization state, and a zero-order light $L_{s0}$ is output in a second polarization state.

As shown in FIG. 11, the polarization filter 560 is provided between the holographic optical device 546 and the floating element 550. The polarization filter 560 is a filter that transmits a light of first polarization and blocks a light of second polarization perpendicular to the light of the first polarization. The polarization filter 560 may be, for example, a polarizer having a polarization axis parallel to a direction of the first polarization. Among lights output from the holographic optical device 546, a primary light diffracted by a target diffraction angle is in a first polarization state, and thus passes through the polarization filter 560 to reach the floating element 550. polarization filter 560. On the other hand, a zero-order light (ghost ray) output from the holographic optical device 546 without being diffracted is in a second polarization state, and thus does not reach the floating element 550 by being blocked by the polarization filter 560. In FIG. 11, the zero-order light (ghost ray) is indicated by an arrow in a dashed line. Because the ghost ray does not reach the floating element 550, occurrence of a ghost image phenomenon may be reduced in the floating image display device 1003.

The floating image display device 1003 of FIG. 11 using a polarization dependent angular selective hologram pattern and a polarization filter is illustrated to be changed from the floating image display device 1000 of FIG. 5, but is not limited thereto and may be changed to a form using a polarization dependent angular selective hologram pattern and a polarization filter like the floating image display device 1001 or 1002 of FIG. 9 or 10.

Figure 13:
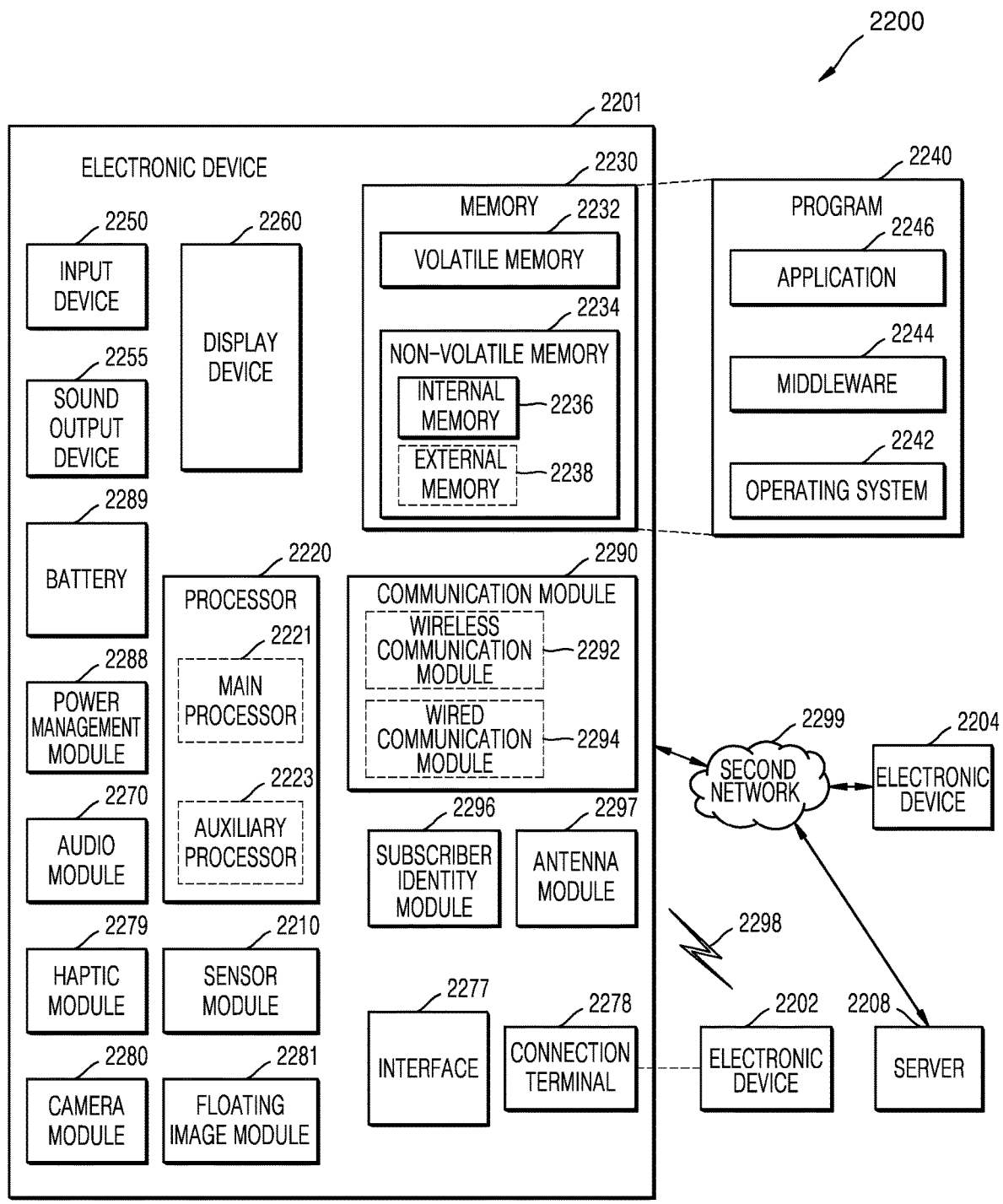
FIG. 13 is a block diagram schematically showing an electronic device including a floating image display device, according to example embodiments of the disclosure.

FIG. 13 is a block diagram schematically showing an electronic device 2201 including a floating image display device, according to example embodiments of the disclosure.

Referring to FIG. 13, in a network environment 2200, the electronic device 2201 may communicate with another electronic device 2202 via a first network 2298 (e.g., a short-range wireless communication network) or communicate with another electronic device 2204 and/or server 2208 via a second network 2299 (e.g., a long-range wireless communication network). The electronic device 2201 may communicate with the electronic device 2204 via the server 2208. The electronic device 2201 may include a processor 2220, a memory 2230, an input device 2250, a sound output device 2255, a display device 2260, an audio module 2270, a sensor module 2210, an interface 2277, a haptic module 2279, a camera module 2280, a floating image module 2281, a power management module 2288, a battery 2289, a communication module 2290, a subscriber identity module 2296, and/or an antenna module 2297. Some of the components of the electronic device 2201 may be omitted or another component may be added to the electronic device 2201. Some of the components may be realized as one integrated circuit. For example, a fingerprint sensor, an iris sensor, or an illumination sensor of the sensor module 2210 may be embedded in the display device 2260 (a display or the like).

The processor 2220 may control one or a plurality of components (e.g., a hardware or software component) of the electronic device 2201 connected to the processor 2220 by executing software (e.g., a program 2240), and may perform various data processes or operations. As a part of data process or operation, the processor 2220 may load, on a volatile memory 2232, a command and/or data received from another component (the sensor module 2210, the communication module 2290, or the like), process a command and/or data stored in the volatile memory 2232, and store result data in a non-volatile memory 2234. The processor 2220 may include a main processor 2221 (a central processing unit, an application processor, or the like) and an auxiliary processor 2223 (a graphics processing unit, an image signal processor, a sensor hub processor, a communication processor, or the like) that is operable together with or independently from the main processor 2221. The auxiliary processor 2223 may use less power than the main processor 2221 and perform a specialized function.

The auxiliary processor 2223 may control functions and/or states related to some components (the display device 2260, the sensor module 2210, the communication module 2290, and the like) from among the components of the electronic device 2201, instead of the main processor 2221 while the main processor 2221 is in an inactive state (a sleep state), or together with the main processor 2221 when the main processor 2221 is in an active state (an application execution state). The auxiliary processor 2223 (the image signal processor, the communication processor, or the like) may be implemented as a part of another functionally-related component (the camera module 2280, the communication module 2290, or the like).

The memory 2230 may store various types of data required by components (the processor 2220, the sensor module 2210, and the like) of the electronic device 2201. The data may include, for example, software (the program 2240 or the like), and input data and/or output data regarding a command related thereto. The memory 2230 may include the volatile memory 2232 and/or the non-volatile memory 2234.

The program 2240 may be stored in the memory 2230 as software, and may include an operating system 2242, middleware 2244, and/or an application 2246.

The input device 2250 may receive a command and/or data to be used in a component (the processor 2220 or the like) of the electronic device 2201 from the outside (a user or the like) of the electronic device 2201. The input device 2250 may include a microphone, a mouse, a keyboard, and/or a digital pen (a stylus pen or the like).

The sound output device 2255 may output a sound signal to the outside of the electronic device 2201. The sound output device 2255 may include a speaker and/or a receiver. The speaker may be used for a general purpose, such as multimedia reproduction or recording reproduction, and the receiver may be used to receive an incoming call. The receiver may be combined as a part of the speaker or may be realized as a separate independent device.

The display device 2260 may visually provide information to the outside of the electronic device 2201. The display device 2260 may include a display, a hologram device, or a projector, and a control circuit for controlling a corresponding device. The display device 2260 may include a touch circuitry configured to detect a touch and/or a sensor circuit (a pressure sensor or the like) configured to measure strength of force generated by the touch.

The audio module 2270 may convert sound into an electric signal or convert an electric signal into sound. The audio module 2270 may obtain sound through the input device 2250 or may output sound through the sound output device 2255 and/or a speaker and/or a headphone of another electronic device (the electronic device 2202 or the like) connected to the electronic device 2201 directly or wirelessly.

The sensor module 2210 may detect an operating state (power, a temperature, or the like) of the electronic device 2201 or an external environment state (a user state or the like), and generate an electric signal and/or a data value corresponding to the detected state. The sensor module 2210 may include a fingerprint sensor, an acceleration sensor, a position sensor, a 3D sensor, or the like, and in addition, may include an iris sensor, a gyro sensor, a pressure sensor, a magnetic sensor, a grip sensor, a proximity sensor, a color sensor, an infrared (IR) sensor, a biometric sensor, a temperature sensor, a humidity sensor, and/or an illuminance sensor.

The interface 2277 may support one or more designated protocols that may be used by the electronic device 2201 to be connected to another electronic device (the electronic device 2202) directly or wirelessly. The interface 2277 may include a high definition multimedia interface (HDMI), a universal serial bus (USB) interface, a secure digital (SD) card interface, and/or an audio interface.

A connection terminal 2278 may include a connector enabling the electronic device 2201 to be physically connected to another electronic device (the electronic device 2202). The connection terminal 2278 may include an HDMI connector, a USB connector, an SD card connector, and/or an audio connector (a headphone connector or the like).

The haptic module 2279 may convert an electric signal into a mechanical stimulus (vibration or motion) or an electric stimulus, which may be recognized by a user via tactile or exercise sense. The haptic module 2279 may include a motor, a piezoelectric device, and/or an electric stimulation device.

The camera module 2280 may capture a still image and a moving image. The camera module 2280 may include a lens assembly including one or more lenses, image sensors, image signal processors, and/or flashes.

The floating image module 2281 may include one of the floating image display devices 1000 through 1003 according to the example embodiments of the disclosure described above, or a device modified therefrom.

The floating image module 2281 may be executed in association with one of the applications 2246 stored in the memory 2230. The applications 2246 may include one or more applications executed in association with driving of the floating image module 2281. For example, the floating image module 2281 may form a floating image according to execution of a first application. Also, a second application may be executed according to a gesture of the user with respect to a displayed floating image. The camera module 2280 may be used as a sensor for recognizing the gesture of the user with respect to the floating image formed by the floating image module 2281. For example, the camera module 2280 may photograph the gesture of the user with respect to the floating image, and the second application may be executed according to content of the photographed gesture.

The power management module 2288 may manage power supplied to the electronic device 2201. The power management module 2288 may be implemented as a part of a power management integrated circuit (PMIC).

The battery 2289 may supply power to components of the electronic device 2201. The battery 2289 may include a non-rechargeable primary battery, a rechargeable secondary battery, and/or a fuel cell.

The communication module 2290 may support establishment of a direct (wired) communication channel and/or a wireless communication channel between the electronic device 2201 and another electronic device (the electronic device 2202, the electronic device 2204, or the server 2208), and performing of communication via an established communication channel. The communication module 2290 is operated independently from the processor 2220 (the application processor or the like), and may include one or more communication processors supporting direct communication and/or wireless communication. The communication module 2290 may include a wireless communication module 2292 (a cellular communication module, a short-range wireless communication module, or a global navigation satellite system (GNSS) communication module) and/or a wired communication module 2294 (a local area network (LAN) communication module or a power line communication module). A communication module corresponding to the communication modules above may communicate with another electronic device via the first network 2298 (a short-range communication network such as the Bluetooth, Wi-Fi direct, or infrared data association (IrDA)), or the second network 2299 (a long-range communication network such as a cellular network, the Internet, or a computer network (LAN or wide area network (WAN)). Such various types of communication modules may be integrated into one component (a single chip or the like) or implemented as a plurality of separate components (a plurality of chips). The wireless communication module 2292 may identify and authenticate the electronic device 2201 in a communication network, such as the first network 2298 and/or second network 2299, by using subscriber information (an international mobile subscriber identifier (IMSI) or the like) stored in the subscriber identity module 2296.

The antenna module 2297 may transmit or receive a signal and/or power to or from the outside (another electronic device). The antenna module 2297 may include a radiator having a conductive pattern formed on a substrate (a printed circuit board (PCB) or the like). The antenna module 2297 may include one or a plurality of antennas. When the plurality of antennas are included, an antenna suitable to a communication method used by a communication network, such as the first network 2298 and/or the second network 2299, may be selected by the communication module 2290 from among the plurality of antennas. A signal and/or power may be transmitted or received between the communication module 2290 and another electronic device, through the selected antenna. In addition to the antenna, another component (a radio frequency integrated circuit (RFIC) or the like) may be included as a part of the antenna module 2297.

Some of the components may be connected to each other via a communication method between peripheral devices (a bus, a general purpose input and output (GPIO), a serial peripheral interface (SPI), a mobile industry processor interface (MIPI) or the like), and may exchange signals (commands, data, or the like).

The command or data may be transmitted or received between the electronic device 2201 and the external electronic device 2204, via the server 2208 connected to the second network 2299. The other electronic device 2202 or 2204 may be a same or different types of devices as or from the electronic device 2201. All or some of operations performed by the electronic device 2201 may be performed by at least one of the other electronic devices 2202 and 2204. For example, when the electronic device 2201 is to perform a certain function or service, the electronic device 2201 may request one or more other electronic devices to perform a part or all of the function or service, instead of performing the function or service by itself. Upon receiving the request, the one or more other electronic devices may perform an additional function or service related to the request, and transmit a result of the performance to the electronic device 2201. In this regard, cloud computing, distributed computing, and/or client-server computing technologies may be used.

Figure 14:
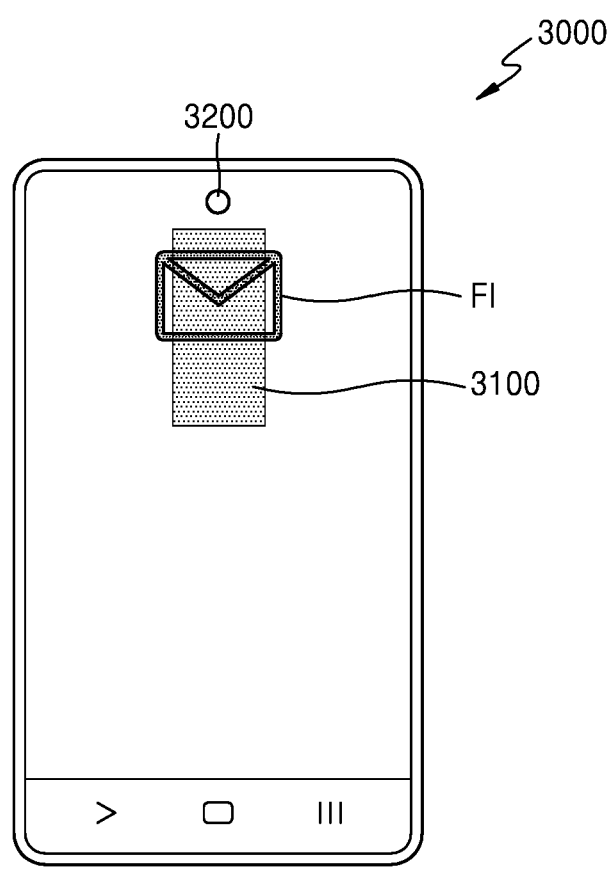
FIGS. 14 and 15 are views showing examples of an electronic device to which a floating image display device is applied, according to example embodiments of the disclosure.
Figure 15:
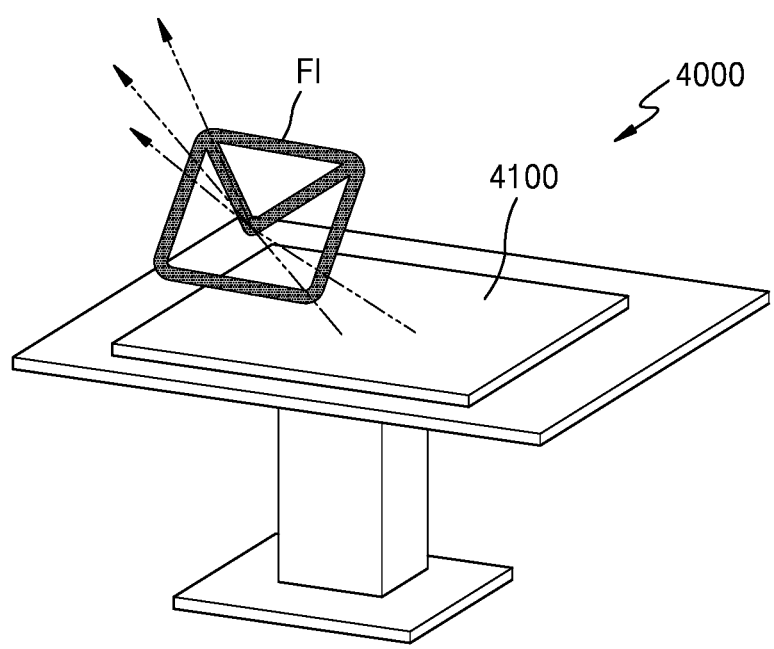

FIGS. 14 and 15 are views showing examples of electronic devices 3000 and 4000 to which floating image display devices 3100 and 4100 are applied, according to example embodiments of the disclosure.

The electronic device 3000 of FIG. 14 has a shape in which the floating image display device 3100 is applied to a mobile phone or a smart phone. The electronic device 3000 includes a processor and a memory, and may execute an application associated with the floating image display device 3100, for example, an application associated with a gesture of a user with respect to the floating image FI. The floating image display device 3100 may form the floating image FI at a location that may be sensed by a self-camera 3200. The self-camera 3200 may be used as a sensor for recognizing the gesture of the user with respect to the floating image FI. The self-camera 3200 may photograph the gesture of the user with respect to the floating image FI, and a certain application provided in the electronic device 3000 may be executed according to content of the photographed gesture.

The electronic device 4000 of FIG. 15 has a shape in which the floating image display device 4100 is applied in a form of a table top.

In addition, application fields of a floating image display device may vary. For example, the floating image display device may be used in combination of a general display device, a television (TV), or a monitor, and may be applied to any one of various products, such as a mobile device, a vehicle, a head-up display, an augmented/virtual reality device, a large signage, a wearable display, a rollable TV, a stretchable display, and the like.

The above description of the disclosure is provided for illustration, and it will be understood by one of ordinary skill in the art that various changes in form and details may be readily made therein without departing from essential features and the scope of the disclosure as defined by the following claims. Accordingly, the example embodiments of the disclosure described above are examples in all aspects and are not limited. For example, each component described as a single type may be implemented in a distributed manner, and similarly, components described as distributed may be implemented in a combined form.

The floating image display device and the electronic device including the same described above are described with reference to the example embodiments of the disclosure shown in the drawings for better understanding, but the example embodiments of the disclosure are only examples and it would be understood by one of ordinary skill in the art that various modifications and equivalent example embodiments of the disclosure are possible therefrom. Therefore, the example embodiments of the disclosure should be considered in descriptive sense only and not for purposes of limitation. The scope of the specification is set forth in the claims rather than the foregoing description, and all differences within the scope equivalent thereto should be construed as being included herein.

The invention claimed is:

1. A floating image display device comprising:
an image forming device configured to form a source image;
a waveguide configured to guide a light of the source image input into the waveguide at one location to be output at another location;
a holographic optical device provided on a proceeding path of the light output from the waveguide, the holographic optical device including a hologram pattern configured to diffract the light having a first incident angle region by a target diffraction angle; and
a floating element including a plurality of corner reflectors, the floating element configured to form a floating image of the source image by forming an image of the light output from the holographic optical device at a first location away from the floating element in mid-air,
wherein the holographic optical device comprises a plurality of hologram pattern layers configured to selectively act according to an incident angle of the light, and
wherein a first hologram pattern layer, among plurality of hologram pattern layers, comprises a plurality of types of angular selective hologram patterns, each having different reaction angle regions.

2. The floating image display device of claim 1, wherein each of plurality of types of angular selective hologram patterns configured to selectively act according to the incident angle of the light.

3. The floating image display device of claim 2, wherein a total region of the reaction angle regions of the plurality of types of angular selective hologram patterns comprises the first incident angle region, and
wherein a number of the plurality of types is set such that the total region is in a range equal to or greater than the first incident angle region.

4. The floating image display device of claim 3, wherein a size of each of the reaction angle regions corresponding to the first incident angle region is equal to or greater than 1° and equal to or less than 5°.

5. The floating image display device of claim 1, wherein the plurality of hologram pattern layers comprises the first hologram pattern layer and a second hologram pattern layer, which are provided along the proceeding path of the light, wherein the first hologram pattern layer comprises a first holographic optical element and the second hologram pattern layer comprises a second holographic optical element, and wherein the first holographic optical element and the second holographic optical element act on different angle regions in the certain incident angle region.

6. The floating image display device of claim 5, wherein the first optical element comprises a plurality of types of first angular selective hologram patterns, among the plurality of types of angular selective hologram, and
wherein the second optical element comprises a plurality of types of second angular selective hologram patterns, among the plurality of types of angular selective hologram.

7. The floating image display device of claim 6, wherein the first holographic optical element comprises first angular selective hologram patterns, among the plurality of first angular selective hologram patterns, configured to diffract an incident light in a first range by the target diffraction angle and distributively manage the first range, and
wherein the second holographic optical element comprises second angular selective hologram patterns, among the plurality of second angular selective hologram patterns, configured to diffract an incident light in a second range different from the first range by the target diffraction angle and distributively manage the second range.

8. The floating image display device of claim 7, wherein a total region of the first range and the second range comprises the first incident angle region, and
wherein total region of the first range and the second range is in a range equal to or greater than the first incident angle region.

9. The floating image display device of claim 5, further comprising a third holographic optical element configured to act on a third region different from a first region corresponding to of the first holographic optical element and a second region corresponding to the second holographic optical element.

10. The floating image display device of claim 1, wherein the target diffraction angle is set based on a distance between the floating element and the first location where the floating image is formed.

11. The floating image display device of claim 1, wherein a thickness of an optical system is smaller than a distance between the floating element and the first location where the floating image is formed, the optical system being formed by the image forming device, the waveguide, and the holographic optical device.

12. The floating image display device of claim 11, wherein a thickness of an optical system is equal to or less than ¼ of a distance between the floating element and the first location where the floating image is formed.

13. The floating image display device of claim 1, wherein the waveguide comprises:
a guiding member configured to totally reflect an incident light a plurality of times therein;
an input coupler configured to input the light of the source image at an angle to be totally reflected in the guiding member; and
an output coupler configured to externally output the light totally reflected the plurality of times in the guiding member.

14. The floating image display device of claim 13, wherein the input coupler comprises a diffraction pattern,
wherein a diffraction angle $\theta_d$ by the diffraction pattern is set to satisfy a following condition:

$$a \sin(1/n) < \theta_d < a \tan(W/(2\ t)),$$

wherein n denotes a refractive index of the guiding member, t denotes a thickness of the guiding member, and W denotes a width of the input coupler.

15. The floating image display device of claim 14, wherein the output coupler comprises a diffraction pattern,
wherein the diffraction pattern is configured to output a light in a direction parallel to a direction in which a light is incident on the input coupler.

16. The floating image display device of claim 1, wherein a distance between the holographic optical device and the floating element is less than a distance between the floating element and the first location where the floating image is formed.

17. A floating image display device comprising:
an image forming device configured to form a source image;
a waveguide configured to guide a light of the source image input into the waveguide at one location to be output at another location;
a holographic optical device provided on a proceeding path of the light output from the waveguide, the holographic optical device including a hologram pattern configured to diffract the light having a first incident angle region by a target diffraction angle; and
a floating element including a plurality of corner reflectors, the floating element configured to form a floating image of the source image by forming an image of the light output from the holographic optical device at a first location away from the floating element in mid-air,
wherein the hologram pattern is a polarization dependent hologram pattern configured to output a primary light diffracted by the target diffraction angle and a non-diffracted zero-order light in different polarization states.

18. The floating image display device of claim 17, further comprising a polarization filter provided between the floating element and the holographic optical device, the polarization filter configured to transmit the primary light, and block the zero-order light.

19. An electronic device comprising:
a floating image display device comprising:
an image forming device configured to form a source image;
a waveguide configured to guide a light of the source image input into the waveguide at a first location to be output at a second *location;
a holographic optical device provided on a proceeding path of the light output from the waveguide, the holographic optical device including a hologram pattern configured to diffract the light having a first incident angle region by a target diffraction angle; and
a floating element including a plurality of corner reflectors, the floating element configured to form a floating image of the source image by forming an image of the light output from the holographic optical device at a first location away from the floating element in mid-air,
wherein the holographic optical device comprises a plurality of hologram pattern layers configured to selectively act according to an incident angle of the light, and
wherein a first hologram pattern layer, among plurality of hologram pattern layers, comprises a plurality of types of angular selective hologram patterns, each having different reaction angle regions.

20. The electronic device of claim 19, further comprising:
a sensor configured to recognize a gesture of a user with respect to the floating image; and
a processor configured to execute a certain application associated with the gesture.

* * * * *